(12) United States Patent
Burczyk

(10) Patent No.: US 8,596,677 B2
(45) Date of Patent: Dec. 3, 2013

(54) SAFETY BELT FOR A VEHICLE

(75) Inventor: Christian Burczyk, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/808,855

(22) PCT Filed: Jul. 2, 2011

(86) PCT No.: PCT/EP2011/003290
§ 371 (c)(1),
(2), (4) Date: Feb. 12, 2013

(87) PCT Pub. No.: WO2012/003949
PCT Pub. Date: Jan. 12, 2012

(65) Prior Publication Data
US 2013/0134695 A1    May 30, 2013

(30) Foreign Application Priority Data
Jul. 8, 2010    (DE) .......................... 10 2010 026 546

(51) Int. Cl.
*B60R 21/18*    (2006.01)

(52) U.S. Cl.
USPC .......................................................... 280/733

(58) Field of Classification Search
USPC ....................................... 280/733, 801.1, 808
See application file for complete search history.

(56) References Cited

U.S. PATENT DOCUMENTS

| | | | |
|---|---|---|---|
| 3,866,940 A | * | 2/1975 | Lewis ............................ 280/733 |
| 6,007,092 A | * | 12/1999 | Martz ............................ 280/733 |
| 6,109,647 A | * | 8/2000 | Akaba et al. ................... 280/733 |
| 6,142,511 A | * | 11/2000 | Lewis ............................ 280/733 |
| 6,220,626 B1 | * | 4/2001 | Utsumi et al. ................. 280/733 |
| 6,286,860 B1 | * | 9/2001 | Adomeit et al. .............. 280/733 |
| 6,340,173 B1 | | 1/2002 | Specht |
| 6,419,264 B1 | | 7/2002 | Tsuji et al. |

(Continued)

FOREIGN PATENT DOCUMENTS

| | | |
|---|---|---|
| DE | 91 03 845 U1 | 5/1991 |
| DE | 198 04 365 A1 | 8/1999 |

(Continued)

OTHER PUBLICATIONS

Corresponding International Search Report with English Translation dated Oct. 21, 2011 (four (4) pages).

(Continued)

*Primary Examiner* — Paul N Dickson
*Assistant Examiner* — Robert A Coker
(74) *Attorney, Agent, or Firm* — Crowell & Moring LLP

(57) ABSTRACT

A seat belt for a vehicle includes a belt webbing with several belt webbing layers and, in a shoulder belt region and a lap belt region, a belt interior located between at least two belt webbing layers to which a gas can be applied. The belt webbing is routed through an opening of a latch plate which is insertable into a buckle, by means of which latch plate the belt webbing is, if the seat belt is fastened, deflected at a lower deflection point in a transitional region from the lap belt region to the shoulder belt region. A gas passage connecting at least two sections of the belt interior is provided at the lower deflection point between the at least two belt webbing layers. The gas passage is a tube that is flexible at least in the radial direction. The flexible tube is plastically or elastically deformable.

11 Claims, 2 Drawing Sheets

(56) References Cited

U.S. PATENT DOCUMENTS

| | | | |
|---|---|---|---|
| 6,471,243 B1* | 10/2002 | Brown | 280/733 |
| 6,505,854 B1* | 1/2003 | Sands et al. | 280/733 |
| 6,585,289 B1* | 7/2003 | Hammer et al. | 280/733 |
| 6,692,020 B2* | 2/2004 | Decomps et al. | 280/733 |
| 6,951,350 B2* | 10/2005 | Heidorn et al. | 280/733 |
| 7,434,833 B2* | 10/2008 | Kore | 280/733 |
| 7,484,755 B2* | 2/2009 | Kokeguchi | 280/733 |
| 7,883,106 B2* | 2/2011 | Mical | 280/733 |
| 2002/0105176 A1* | 8/2002 | Hammer et al. | 280/733 |
| 2003/0015863 A1* | 1/2003 | Brown et al. | 280/733 |
| 2003/0168837 A1* | 9/2003 | Schneider et al. | 280/733 |
| 2009/0236828 A1* | 9/2009 | Foubert et al. | 280/728.2 |

FOREIGN PATENT DOCUMENTS

| | | |
|---|---|---|
| DE | 198 57 517 A1 | 6/2000 |
| DE | 200 04 363 U1 | 8/2000 |
| DE | 10 2010 023 875 A1 | 12/2011 |
| EP | 1 053 133 B1 | 11/2000 |
| JP | 2006-96168 A | 4/2006 |
| WO | WO 2008/120417 A1 | 10/2008 |

OTHER PUBLICATIONS

German-language Written Opinion (PCT/ISA/237) dated Oct. 21, 2011 (six (6) pages).

* cited by examiner

SAFETY BELT FOR A VEHICLE

BACKGROUND AND SUMMARY OF THE INVENTION

Exemplary embodiments of the present invention relate to a seat belt for a vehicle, comprising a belt webbing that comprises several belt webbing layers and, in a shoulder belt region and a lap belt region, at least one belt interior which is located between at least two belt webbing layers and to which a gas can be applied, wherein the belt webbing is guided through an opening of a latch plate which can be inserted into a buckle, by means of which latch plate the belt webbing is, if the seat belt is fastened, deflected at a lower deflection point in a transitional region from the lap belt region to the shoulder belt region, and wherein a gas passage connecting at least two sections of the belt interior is provided at the lower deflection point between the at least two belt webbing layers.

German Patent Document DE 91 03 845 U1 discloses a restraint device for occupants of a vehicle. The restraint device comprises a seat belt with a buckle and a deflection fitting. The seat belt is designed as a flat tube and coupled to a device by means of which the tube, in an accident-related sudden deceleration of the vehicle equipped therewith, can be inflated within fractions of a second with a gas, turning it into a tube with a substantially circular cross-section.

German Patent Document DE 198 57 517 A1 disclose an inflatable belt webbing for a seat belt made of a two-layered woven fabric. A webbing width of the fabric is divided into three parts of approximately equal width, these being a left-hand outer part, a central part and a right-hand outer part, the warp threads of the parts differing in thickness. The outer parts and the inner part are folded in such a way that they form a flattened Z. In two folding zones, at least one tear-open thread is woven or sewn into the fabric, the tear-open thread breaking under a presettable breaking load, so that the individual fabric layers move in preset directions and the belt webbing is opened by means of a blown-in explosion gas to form an inflated belt bag. In order to apply gas to the belt webbing, a gas delivery hose is provided, is placed in the belt webbing between darts. For inflation, the belt webbing is supplied with the explosion gas by means of the gas delivery hose.

European Patent Document EP 1 053 133 B1 describes a three-point belt with shoulder and lap belt parts of a belt webbing, which are inflatable at least in the shoulder belt region. At a deflection point, the seat belt is provided with an insertion part that can be inserted into a buckle, the belt webbing being deflected in a transitional region from the lap belt part to the shoulder belt part at the deflection point if the seat belt is fastened. In the region of the insertion part, the belt webbing is provided at the deflection point with a gas passage for establishing a gas flow connection between the belt interiors of the shoulder belt part and the lap belt part. An opening cross-section of the gas passage is smaller than the cross-section of a filled belt interior, which can be filled continuously and extends in the belt webbing that forms the shoulder and lap belt parts as well as in the transitional region. At least in the belt interior of the transitional region guided around the deflection point, the gas passage forms a radially reinforced gas line via the opening cross-section of which the interiors of the shoulder belt part and the lap belt part can be inflated. The gas passage consists of a tubular piece having a relatively high rigidity in the radial direction, so that the opening cross-section formed by the gas passage does not collapse as the belt webbing is deflected about the deflection point. The seat belt further comprises a gas feed in the region of an end of the lap belt part that is opposite the transitional region.

In a German Patent application number 10 2010 023 875.9, which is not subject to prior publication, a seat belt for a vehicle is described, which seat belt comprises an inflatable belt webbing. A gas passage consisting of a tube which is flexible at least in the radial direction extends in the belt webbing passing through an opening in the latch plate.

One disadvantage of these known inflatable seat belts is that during the inflation process high gas pressures act internally on the seat belt due to the high speed with which the belt webbing has to be inflated in an accident. In this process, the belt webbing is increasingly stressed, in particular if subjected to pulsed maximum pressure loads. In order to avoid any damage caused by this stressing of the belt webbing, which would affect its function, the belt webbing has to be designed to be correspondingly complex, for example by using a reinforced belt webbing fabric.

Exemplary embodiments of the present invention are directed to providing a seat belt for a vehicle that is improved compared to prior art.

In accordance with exemplary embodiments of the present invention, a seat belt for a vehicle comprises a belt webbing having several belt webbing layers and, in a shoulder belt region and a lap belt region, at least one belt interior that is located between at least two belt webbing layers and to which a gas can be applied, wherein the belt webbing is guided through a recess of a latch plate which can be inserted into a buckle, by means of which latch plate the belt webbing is, if the seat belt is fastened, deflected at a lower deflection point in a transitional region from the lap belt region to the shoulder belt region, and wherein a gas passage connecting at least two sections of the belt interior is provided at the lower deflection point between the at least two belt webbing layers.

The two sections of the belt interior are formed by the deflection of the belt webbing in the region of the latch plate and the resulting tensile and compressive forces.

The gas passage is represented by a tube which is flexible, i.e. collapsible, at least in the radial direction.

If gas is applied to the belt interiors in order to increase a surface area of the belt webbing, which happens if the vehicle collides with an obstacle, the tube forms an open flow cross-section due to the internal pressure acting in the interior of the tube. Accordingly, even the shoulder region of the seat belt can be filled with gas from a gas generator located at a lower mounting point of the belt webbing, even though the belt webbing is deflected at the lower deflection point. This results in an optimized gas filling of the belt webbing. The gas may be, for example, air or reaction gases generated in a pyrotechnic gas generator and by the ignition of the fuel charge.

According to the invention, the tube, which is designed to be flexible as a gas passage, is elastically deformable.

Due to this elasticity of the tube, a so-called Windkessel effect as known in medicine in relation to blood vessels located near the heart, such as the aorta, is obtained. As the belt webbing is filled with gas, the gas of the gas generator connected to one end of the tube first flows through the elastic tube before the gas flows from the open other end of the tube into the inflatable belt webbing. Due to its elasticity, the elastic tube expands in proportion to the gas pressure acting on the tube. If the pressure is reduced, the tube at least partially contracts in proportion to the pressure acting on the tube, thereby forming a type of pressure accumulator. In this way, gas pressure peaks are attenuated, so that the belt webbing is stressed less severely. If restricted at bends, kinks, hangers and guides, the belt can moreover locally expand radially to a degree sufficient to allow the pressure wave pass through the restriction in the tube. Tube sections located at a greater distance from the gas generator can be filled with an adequate gas pressure as well.

In an alternative embodiment, the tube, which is designed to be flexible as a gas passage, is plastically deformable. As pressure is reduced, the tube, unlike the elastic tube, cannot contract again and therefore does not act as a pressure accumulator. Pulsed pressure peaks can, however, be attenuated by the plastic expansion of the tube as well, and the use of a plastically deformable material may be simpler, for example cheaper.

In principle, the elastic tube can also be used to attenuate pulsed maximum pressure loads without connecting two sections of the belt interior. In this embodiment, one end of the tube is directly connected to the gas generator and the other end terminates in a belt interior of the inflatable belt webbing which is adjacent to the gas generator.

In a further development, the elasticity of the tube is at least so high that the internal cavity radius reversibly increases by 10% or more at a gas pressure peak relative to normal pressure, in order to obtain a significant Windkessel effect.

In a further embodiment, the tube has only a minimum elasticity along its longitudinal axis, so that the position of the end of the tube through which the belt webbing is filled with gas is not changed by longitudinal expansion. An elasticity perpendicular to the longitudinal axis does not cause any problems in this respect.

In a further development, the tube is compressed flat between the belt webbing layers if the belt webbing is not filled with gas. As a result of this design of the gas passage as a collapsible tube lying flat between the belt webbing layers, the belt webbing is flexible and can be retracted and paid out simply, using little force. The belt webbing can also be easily displaced within the latch plate. In addition, due to the flexible design of the tube and thus of the belt webbing, the belt webbing can be positioned optimally on the vehicle occupant, invariably offering maximum protection. The flexibility of the belt webbing and the simple retraction and pay-out of the belt webbing results, in addition to advantageous haptics, in a high level of comfort for the vehicle occupant.

The tube is further preferably designed to be seamless, improving its tightness against radially escaping gas. According to a further development of the invention, the tube is woven seamlessly using generally known methods. The fabric is preferably a synthetic fiber fabric, in particular a polyester yarn fabric, which is characterised by a particularly high stability. As the tube is made of a woven fabric, it can easily be inserted into the belt webbing in a flat state.

An inside of the tube is then preferably coated with a fluid-impermeable layer, in particular with latex or silicone. In this way, the tube is made fluid-tight. This ensures that the connection of the belt interior between the lap belt region and the shoulder belt region is not broken in the gas filling process, because a gas escape from the tube in the radial direction is avoided.

In order to avoid a slipping of the tube within the belt webbing while the seat belt is fastened and removed and in its fastened state, the tube is secured to at least one of the belt webbing layers in a further development. This is, for example, carried out by bonding the tube to the inside of the belt webbing layer in question. The resulting adhesive seam preferably has only a small width, allowing the tube to unfold optimally.

If the latch plate is inserted into the buckle and at a minimum pay-out length of the belt webbing, the tube preferably extends no further than an upper deflection point. This means that the tube, if the seat belt is fastened, extends no further than the upper deflection point, which is preferably located in the upper region next to the vehicle occupant or the vehicle seat. In addition, the inflatable belt interior extends no further than the upper deflection point in the shoulder belt region at a minimum pay-out length. In this way, an inflation of the belt webbing behind the upper deflection point is avoided. As a result, the gas quantity to be introduced into the belt interiors is minimized. In addition, any deformation of, damage to or loosening of paneling within the vehicle, behind which the belt webbing runs, is avoided, so that the risk of injury to the vehicle occupant(s) is minimized.

In a further embodiment, the tube is directly coupled to the gas generator, thereby forming a so-called gas lance. This advantageously results in a further improvement of the unfolding of the tube and consequently of the belt webbing, in particular in a shortening of the time leading to the unfolding.

The width of the belt webbing is preferably divided into several parts of approximately equal width, the belt webbing being folded once or several times parallel to its longitudinal dimension. In the region of the interior folded layers, the belt webbing is preferably woven thinner than in the region of the two outer folded layers. As a result, the belt webbing has an advantageously minimal thickness, a high flexibility and a low weight.

The folded layers are joined to one another by tear-open threads that break as the gas is applied to the belt webbing, followed by the unfolding of the belt webbing. In a collision of the vehicle, a surface area of the belt webbing is therefore increased as a result of its unfolding, thereby minimizing the load acting on the vehicle occupant.

The tear-open threads are inserted at the edges into the folded layers of the belt webbing in such a way that they form seams extending in the longitudinal direction of the belt webbing, these seams breaking when the gas acts on the belt interiors, i.e. when a resulting predetermined tensile load is exceeded. By the tear-open threads, the individual folded layers of the belt webbing are securely joined at the edges. The tear-open threads are inserted into the belt webbing in such a way that the latter maintains its flat shape in use. Furthermore, a defined unfolding of the belt webbing under the action of the gas is obtainable. In combination with the gas-tight design of the gas passage, an internal pressure within the gas passage can be maintained for a longer time, thereby facilitating an optimized and complete unfolding of the belt webbing.

In one variant, the width of the belt webbing is divided into three parts of approximately equal width, the belt webbing being folded twice parallel to its longitudinal dimension in such a way that it has a flattened Z-shape. After the unfolding of the belt webbing, a contact surface of the belt webbing on the vehicle occupant becomes almost three times as large as in the folded state, so that the force acting on the vehicle occupant is reduced in the region of the unfolding of the belt webbing.

Embodiments are explained in greater detail below with reference to drawings.

BRIEF DESCRIPTION OF THE DRAWING FIGURES

DETAILED DESCRIPTION

Corresponding parts are identified by the same reference numbers in all figures.

Figure 1:
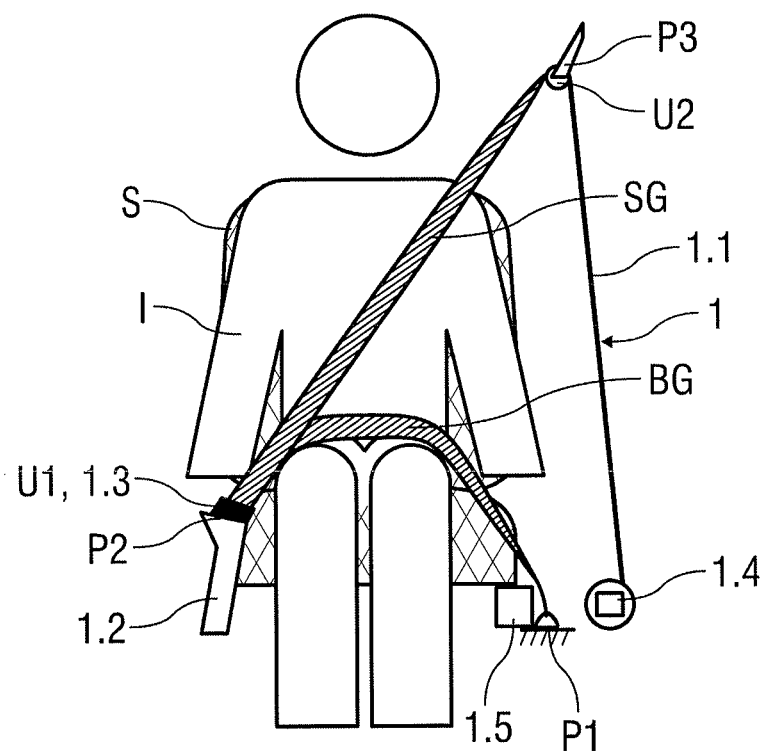
FIG. 1 is a diagrammatic representation of a vehicle occupant on a vehicle seat and of a seat belt according to the invention.

In FIG. 1, a vehicle occupant I is shown on a vehicle seat S, the vehicle occupant I wearing a seat belt 1 according to the invention. The seat belt 1 is a so-called three-point belt, which ties the vehicle occupant to a vehicle body at three points P1 to P3.

A first point P1 is located in the lower region next to the vehicle seat S, in particular on a B-post of the vehicle. At this first point P1, a belt webbing 1.1 of the seat belt 1 is secured to the vehicle body.

From this first point P1, the belt webbing 1.1 is routed via a lap region of the vehicle occupant I to a second point P2, which is represented by a buckle 1.2 secured to the vehicle body and preferably including an integrated tensioner (not shown in the drawing). A so-called latch plate 1.3 engages the buckle 1.2 or is tied thereto. The region of the belt webbing 1.1 running across the lap region of the vehicle occupant I is hereinafter referred to as lap belt region BG and is provided for the restraint of the lap region of the vehicle occupant I.

The belt webbing 1.1 is routed through an opening in the latch plate 1.3 (not shown in the drawing) and deflected. The latch plate 1.3 forms a lower deflection point U1.

From the lower deflection point U1, the belt webbing 1.1 is routed across an upper body region of the vehicle occupant I to an upper deflection point U2, which forms the third point P3. The section of the belt webbing 1.1 between the second point P2 and the third point P3 is hereinafter referred to as shoulder belt region SG and is provided for the restraint of the upper body region of the vehicle occupant I.

The belt webbing 1.1 is displaceably arranged in the latch plate 1.3 to adapt a length of the lap belt region BG and the shoulder belt region SG individually to the size of the body of the vehicle occupant I.

The upper deflection point U2 is preferably vertically adjustable at the B-post of the vehicle, so that the height of the seat belt 1 can be individually adjusted to the size of the body of the vehicle occupant I.

From the upper deflection point U2, the belt webbing 1.1 is routed to a belt retractor 1.4, which is preferably secured in the lower region of the B-post of the vehicle. The belt retractor 1.4 is provided to retract the belt webbing 1.1 of the seat belt 1 when not in use and to tension the belt webbing 1.1 at the body of the vehicle occupant I when the seat belt 1 is fastened. The belt retractor 1.4 preferably includes a so-called retractor tensioner (not shown in the drawing), by means of which the belt webbing 1.1 can, if the vehicle collides with an obstacle, be tensioned in such a way that the vehicle occupant I is optimally positioned in the vehicle seat S, resulting in an optimized restraint of the vehicle occupant I.

In order to reduce a loading of the vehicle occupant I if the vehicle collides with an obstacle, the belt webbing 1.1 is designed as a two-layer, twice folded and inflatable belt webbing which, on detecting a collision or an imminent, unavoidable collision, can be filled with a gas in advance and then unfolds. For this purpose, a gas generator 1.5 is provided, by means of which a belt interior G formed between the belt webbing layers 1.1.1 and 1.1.2 of the belt webbing 1.1, which is shown in greater detail in FIG. 2, can be filled with gas.

Figure 2A:
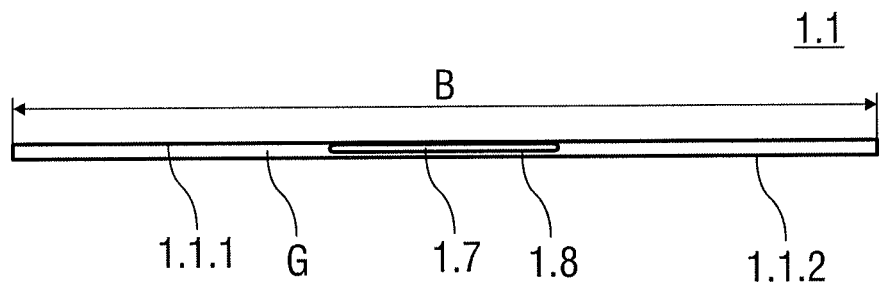
FIG. 2A is a diagrammatic sectional view of a belt webbing of the seat belt from FIG. 1 in the unfolded state with a gas passage placed flat between two belt webbing layers.

FIG. 2A is a sectional view of the belt webbing 1.1. The belt webbing 1.1 has two belt webbing layers 1.1.1 and 1.1.2.

In the production process, the belt webbing 1.1 is preferably first formed from one fabric layer, which is then folded once and the edge regions of which are joined to one another in such a way that the belt webbing 1.1 becomes tubular. To join the belt webbing layers 1.1.1 and 1.1.2, they are, for example, bonded, sewn and/or woven to each other. Between the belt webbing layers 1.1.1 and 1.1.2, a belt interior G is formed.

The fabric layer is formed from a woven fabric which is woven from plastic yarns. Preferred plastics for this purpose are polyester and/or nylon. The fabric is characterised by a long service life and high mechanical and tensile strength as well as high flexibility, so that a maximum surface area of the belt webbing 1.1 is in contact with the vehicle occupant I.

To produce the tubular belt webbing 1.1, the belt 1 may, as an alternative to folding, be made of two fabric layers that are placed on top of each other and joined to each other in their edge regions. Once again, the fabric layers may be bonded, sewn and/or woven to each other.

To reduce gas escape from the belt webbing 1.1, the belt webbing layers 1.1.1 and 1.1.2 are coated with a sealing material at least on the inside, i.e. the side facing the belt interior G. This sealing material may be, for example, silicone or latex.

The belt webbing 1.1 is folded several times to minimize a loading of the vehicle occupant I if the vehicle collides with an obstacle.

Figure 2B:
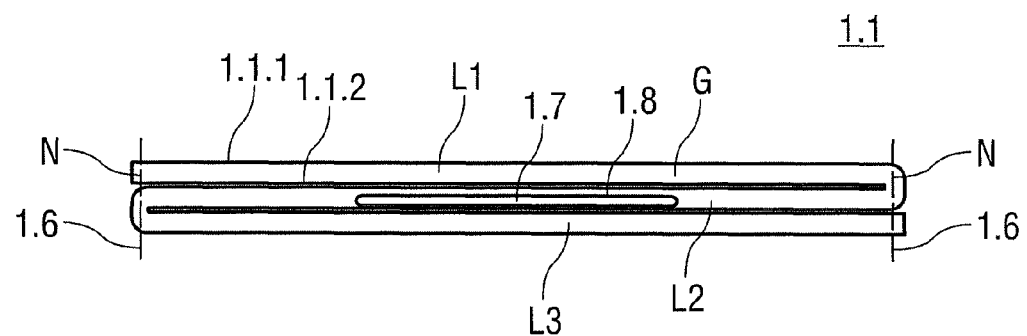
FIG. 2B is a diagrammatic sectional view of a belt webbing of the seat belt from FIG. 2A in the folded state.

FIG. 2B shows the belt webbing 1.1 with a double fold.

If the vehicle collides with an obstacle, several folded layers L1 to L3 of the belt webbing 1.1 unfold as the gas is applied to the belt interior G, so that a surface area of the belt webbing 1.1 is increased when restraining the vehicle occupant I.

The belt webbing 1.1 is folded twice parallel to its longitudinal dimension to produce the folded layers L1 to L3. The belt 1 has a flattened Z-shape when viewed from the front. For this purpose, a width B of the belt webbing 1.1 is divided into three parts of approximately equal width. A first outer part of the belt webbing 1.1 is turned over in such a way that the first outer part lies below a central part of the belt webbing 1.1. A second outer part is placed on the central part after folding, forming three folded layers L1 to L3.

At the edges, the folded layers L1 to L3 of the belt webbing 1.1 are joined to one another by woven or sewn tear-open threads 1.6 to fix the folded arrangement. At the edges, each of the tear-open threads 1.6 forms a seam N.

When the gas is applied to the belt interior G, the belt interior G expands (as illustrated in greater detail in FIG. 3), so that the tear-open threads 1.6 break in a defined manner when a preset deformation of the belt webbing 1.1 is reached, thereby destroying the seams N. The preset deformation of the belt webbing 1.1 occurs on reaching a preset minimum pressure in the belt interior G, and due to the deformation of the belt webbing 1.1 tensile forces act on the tear-open threads 1.6, thereby breaking the tear-open threads 1.6. As a result, the belt webbing 1.1 unfolds due to the opening of the folded layers of the belt webbing 1.1.

In order to provide maximum protection for the vehicle occupant I, the belt webbing 1.1 is folded in the shoulder belt region SG and the lap belt region BG. In embodiments of the seat belt 1, which are not illustrated, the belt webbing 1.1 is folded in the shoulder belt region SG or in the lap belt region BG.

The region where the belt webbing 1.1 is folded extends no further than the upper deflection point U2, so that an unfolding of the belt webbing 1.1 in the region between the upper deflection point U2 and the belt retractor 1.4 and consequently an undefined unfolding in the shoulder belt region SG are avoided. The folded and therefore unfoldable region of the belt webbing 1.1 extends, if the latch plate 1.3 is inserted into the buckle 1.2 and at a minimum pay-out length of the belt webbing 1.1, no further than the upper deflection point U2. The minimum pay-out length of the belt webbing 1.1 occurs in a situation in which the seat belt 1 is fastened while the vehicle seat S is empty, i.e. while the vehicle occupant I does not sit on the vehicle seat S.

To feed the gas into the belt interior G, the belt interior G is connected to the gas generator 1.5, which, on detecting a collision or earlier, feeds the gas into the belt interior G. In order to obtain an even and complete unfolding of the belt webbing 1.1 in all regions, the preset minimum pressure has to be reached in all regions, i.e. in the whole of the belt interior G.

The gas generator 1.5 is located at the mounting point of the belt webbing 1.1, i.e. at P1. To unfold the belt webbing 1.1, the gas is fed by the gas generator 1.5 through the belt interior G as far as the shoulder belt region SG of the belt webbing 1.1.

A gas passage 1.7 is provided in the region of the lower deflection point U1 within the belt interior G to enable the gas to flow at the lower deflection point U1, i.e. in the region where the belt webbing 1.1 is deflected at the latch plate 1.3, and to attenuate pressure peaks while the belt webbing is being filled. This gas passage 1.7 connects the gas generator 1.5 to the belt interior and facilitates the filling of the shoulder belt region SG behind the latch plate 1.3.

The gas passage 1.7 is represented by an elastically deformable tube 1.8, which is flexible in the radial direction and which lies flat between the belt webbing layers 1.1.1, 1.1.2. In the illustrated embodiment of the belt webbing 1.1, the gas passage 1.7 is installed in the middle between the edge regions of the unfolded belt webbing 1.1. The gas passage 1.7 therefore lies in its central part of the folded belt webbing 1.1.

The tube 1.8 forming the gas passage 1.7 is made of a synthetic fiber fabric and seamless, and a layer of silicone and/or latex, which is impermeable to fluids, is applied to the inside of the tube 1.8. This makes the tube 1.8 very flexible and fluid-tight and enables it to be inserted extremely flat into the belt webbing 1.1. The elasticity of the tube can, for example, be influenced by the type of weave or by the material of the woven fabric. A silicone or rubber tube can also be used; this is, for example, reinforced in a further embodiment by netting.

If the gas is applied to the belt interior G, the gas passage 1.7 unfolds in such a way that a free, elastically deformable flow cross-section is created within the gas passage 1.7.

Figure 3:
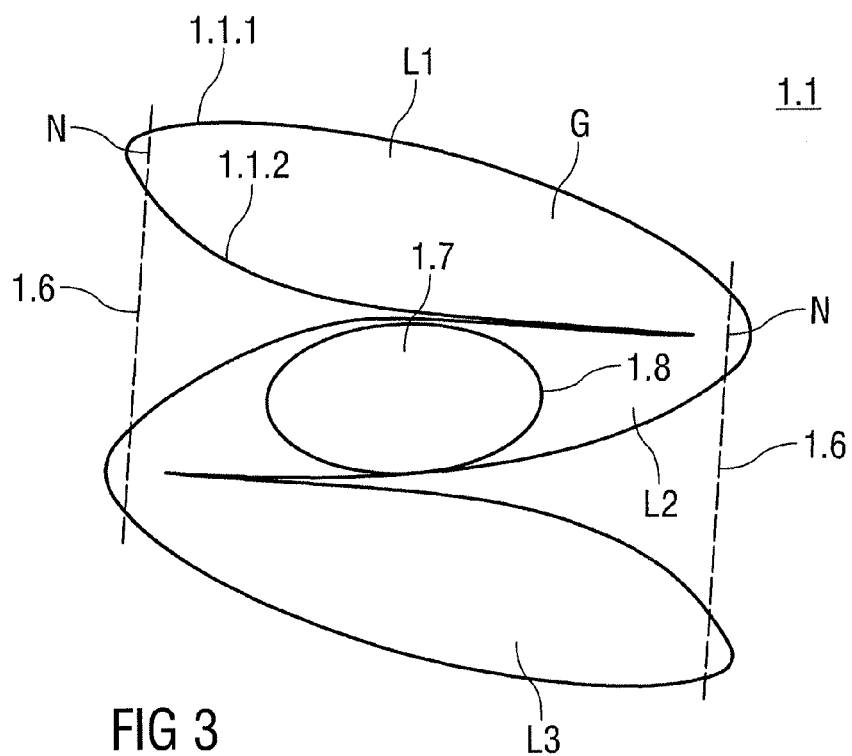
FIG. 3 is a diagrammatic sectional view of the belt webbing from FIG. 2B in a state in which gas is applied to the gas passage.

FIG. 3 shows the belt webbing 1.1 in a state in which gas has been applied to the gas passage 1.7 and to the belt interior G, but the tear-open threads 1.6 are not broken. If the pressure within the belt interior G and the gas passage 1.7 is increased further, the folded regions of the belt webbing 1.1 expand further in a manner not shown in the drawing; this is accompanied by an increased tensile loading of the tear-open threads 1.6, so that the tear-open threads 1.6 break and the folded layers of the belt webbing 1.1 unfold.

As a result of the provision of the gas passage 1.7 in the belt webbing 1.1 in the region of the lower deflection point U1, pressure peaks are avoided in the filling of the belt webbing, and the gas fed by the gas generator 1.5 into the belt interior G can also be fed into the shoulder belt region SG of the belt interior G, resulting in an optimized and defined filling of the belt interior G both in the lap belt region BG and in the shoulder belt region SG of the seat belt 1.

To prevent a slippage of the gas passage 1.7 within the belt webbing 1.1, the gas passage 1.7 is secured to the first belt webbing layer 1.1.1 in the central part of the belt webbing 1.1. It is secured by bonding, the joint surface area between the gas passage 1.7 and the first belt webbing layer 1.1.1 being kept as small as possible in order to obtain an unaffected unfolding of the gas passage 1.7 and the belt interior G.

In one variant of the seat belt 1, the gas passage 1.7 extends from the gas generator 1.5 into the shoulder belt region SG of the belt webbing 1.1. The gas passage 1.7 terminates within the belt interior G in the shoulder belt region SG, so that the gas can flow from an end-side opening of the gas passage 1.7 into the belt interior G in the shoulder belt region SG. In this case, the gas generator 1.5 has in a further development several gas outlets (not shown in the drawing), at least one of them terminating into the gas passage 1.7. At least one further gas outlet terminates into the belt interior G in the lap belt region BG. In this way, both the shoulder belt region SG and the lap belt region BG of the belt interior can be supplied with gas in an optimum manner.

The gas passage 1.7 likewise extends no further than the upper deflection point U2, so that an "inflation" of the belt webbing 1.1 between the upper deflection point U2 and the belt retractor 1.4 is avoided.

In embodiments of the seat belt 1 which are not shown in the drawings, the belt webbing 1.1 may, in deviation from the two-layer, twice-folded design, have another number of layers and different folding arrangements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A seat belt for a vehicle, comprising:
a belt webbing comprising
several belt webbing layers; and
at least one belt interior in a shoulder belt region and a lap belt region of the seat belt, the at least one belt interior being located between at least two belt webbing layers of the several belt webbing layers and the at least one belt interior being configured to receive a gas;
a latch plate with an opening through which the belt webbing is routed, the latch plate configured to be insertable a buckle, wherein the latch plate is configured so that when the seat belt is fastened the belt webbing is deflected at a lower deflection point in a transitional region from the lap belt region to the shoulder belt region; and
a gas passage connecting at least two sections of the belt interior is arranged at the lower deflection point between the at least two belt webbing layers, wherein the gas passage is a tube that is flexible at least in the radial direction, wherein the flexible tube is plastically or elastically deformable, and wherein the tube is configured so that when no gas is applied to the belt webbing the tube is compressed flat between the belt webbing layers.

2. The seat belt according to claim 1, wherein the tube is at least so plastic or elastic that an internal cavity radius reversibly increases at least partially by 10% or more under gas pressure relative to normal pressure.

3. The seat belt according to claim 1, wherein the tube is more plastic or more elastic perpendicular to its longitudinal dimension than along its longitudinal dimension.

4. The seat belt according to claim 1, wherein when the latch plate is inserted into the buckle and at a minimum pay-out length the tube extends no further than an upper deflection point.

5. The seat belt according to claim 4, wherein the width of the belt webbing is divided into three parts of approximately equal width, the belt webbing being folded twice parallel to its longitudinal dimension in such a way that it has a flattened Z-shape.

6. The seat belt according to claim 1, wherein a width of the belt webbing is divided into several parts of approximately equal width, the belt webbing being folded once or several times parallel to its longitudinal dimension.

7. The seat belt according to claim 6, wherein the folded layers of the belt webbing are joined to one another, at least at the edges, by seams extending in a longitudinal direction of the belt webbing.

8. The seat belt according to claim 7, wherein the seams are tear-open threads configured to break when the gas is applied to the belt interior.

9. The seat belt according to claim 1, wherein the flexible tube is plastically deformable.

10. The seat belt according to claim 9, wherein the tube is made of a fluid-tight woven fabric.

11. The seat belt according to claim 1, wherein the tube is secured to at least one of the several belt webbing layers.

* * * * *